US005520335A

United States Patent [19]
Claussen et al.

[11] Patent Number: 5,520,335
[45] Date of Patent: May 28, 1996

[54] SPRAY HOOD AND ASSEMBLY INCLUDING THE SPRAY HOOD

[75] Inventors: Steven W. Claussen; Thomas J. Gorres, both of Benson; Michael D. O'Dougherty, Maplewood; Dean W. Weckwerth, Cashel Township, Swift County, all of Minn.

[73] Assignee: C.A.P., Inc., Benson, Minn.

[21] Appl. No.: 271,380

[22] Filed: Jul. 6, 1994

[51] Int. Cl.$^6$ .................................................. A01G 13/00
[52] U.S. Cl. ........................... 239/104; 239/168; 239/172
[58] Field of Search .................................. 239/172, 288, 239/288.5, 148, 168, 169, 167

[56] References Cited

U.S. PATENT DOCUMENTS

| | | | |
|---|---|---|---|
| 2,641,505 | 6/1953 | Valois | 239/168 |
| 4,379,522 | 4/1983 | Elliott et al. | 239/167 |
| 4,441,655 | 4/1984 | Blumhardt | 239/167 X |
| 4,456,180 | 6/1984 | Lury | 239/58.6 X |
| 4,634,051 | 1/1987 | Dudley | 239/168 |
| 4,711,398 | 12/1987 | Ganderton et al. | 239/167 |
| 4,736,888 | 4/1988 | Fasnacht | 239/169 X |
| 4,947,581 | 8/1990 | Claussen et al. | 47/1.7 |
| 5,069,090 | 12/1991 | Clark | 81/3.09 |
| 5,155,935 | 10/1992 | Claussen et al. | 47/1.7 |
| 5,156,338 | 10/1992 | Booland et al. | 239/288 |
| 5,248,090 | 9/1993 | Williamson | 239/168 |
| 5,371,969 | 12/1994 | Claussen et al. | 47/1.7 |

FOREIGN PATENT DOCUMENTS 1314571  12/1962  France .................................. 239/168

OTHER PUBLICATIONS

Copy of drawings of a planter banding hood illustrated in U.S. Design Patent Application No. 327,558, filed Mar. 23, 1989, now abandoned, which banding hood was in public use and on sale more than one year prior to the filling date of the subject application.
Copy of page 61 of a Catalog entitled "94–95" Custom Ag Products, Inc., East Highway 12, Box 186, Benson, MN 56215, illustrating Hose Shank Nozzle Bodies and Vari–Spacing Clamps.

*Primary Examiner*—Kevin P. Weldon
*Attorney, Agent, or Firm*—William L. Huebsch

[57] ABSTRACT

An assembly adapted for use to spray liquids toward the ground while the assembly limits the drift of such sprayed liquids. The assembly has a frame including a supported portion adapted to be mounted on a mobile unit adapted to transport the frame along the ground, and a hood support portion including a first elongate hood support member. A plurality of separate hoods each having spaced diverging opposite front and rear side walls projecting from opposite sides of a top wall are attached along the elongate hood support member with their side walls generally parallel to said elongate hood support member and depending downwardly from said top walls of said hoods. A liquid distribution system including spray nozzles within the hoods can direct liquid spray toward the ground, whereupon the top and side walls will limit the drift of such liquid spray.

19 Claims, 8 Drawing Sheets

SPRAY HOOD AND ASSEMBLY INCLUDING THE SPRAY HOOD

TECHNICAL FIELD

The present invention relates to assemblies adapted for use to spray liquids toward the ground while the assembly limits the drift of such sprayed liquids, and particularly relates to such assemblies used to spray herbicides.

BACKGROUND

Assemblies are known which have been used to spray liquids such as herbicides on the ground while the assembly limits the drift of the sprayed liquids. One such assembly, sold for several years under the trade designation "Conservation Spray-Hood Applicators" by Custom Ag Products, Inc., Benson, Minn., is used to apply a herbicide (e.g., the herbicide commercially available as "Roundup" (R.T.M.) from Monsanto) on the ground between rows of plants to kill weeds between those rows. That assembly, more fully described in U.S. patent application Ser. No. 08/133,604 filed Oct. 8, 1993, now U.S. Pat. No. 5,371,969 includes spray shields moved between the rows within which the herbicide is sprayed.

DISCLOSURE OF INVENTION

The present invention provides a simple and effective assembly adapted for use to spray liquids such as a herbicide toward the ground while the assembly limits the drift of such sprayed liquid, which assembly is particularly useful to spray such liquids on the ground between rows of vine crops (e.g., grapes) or between tree crops (e.g., nuts or fruits).

According to the present invention there is provided an assembly comprising a frame including a supported portion adapted to be mounted on a mobile unit adapted to transport the frame along the ground, and a hood support portion comprising a first elongate hood support member; a plurality of separate hoods each having a top wall and spaced diverging opposite front and rear side walls projecting from opposite sides of the top wall which are attached along the elongate hood support member with the side walls of the hoods generally parallel to the elongate hood support member and depending downwardly; and a liquid distribution system including spray nozzles and nozzle mounting means mounting spray nozzles within the hoods in a positions adapted to direct liquid spray toward the ground, whereupon the top and side walls will limit the drift of such liquid spray.

The hoods, which can have rather short lengths between their ends (e.g., about 20 inches) can be attached end to end along the elongate hood support member and can advantageously have end openings adapted to afford movement of liquid sprayed into the space in one hood through such end openings and into the space in an adjacent hood.

Preferably, the hoods are moldings of stiff flexible polymeric material (e.g., of polypropylene) having reinforcing ridges generally parallel to their ends and spaced between their ends with two of those ridges on each hood having ridge parts projecting away from its top wall past the major portion of its rear side wall. Those ridge parts of the hoods are attached along the elongate hood support member so that the top wall is positioned at one side of the elongate hood support member where it is easily accessed to insert or remove nozzles from the hood.

Also, preferably the frame includes adjustment means between its hood support portion and its supported portion for adjusting the height of the hood support portion above the ground relative to the supported portion.

Additionally the hood support portion can further include flanking elongate hood support members having a plurality of the separate hoods attached along their lengths and having spray nozzles included in the liquid distribution system mounted therein, and mounting means for mounting inner ends of each of the flanking elongate hood support members on the hood support portion adjacent a different one of the ends of the first elongate hood support member. Those mounting means can include novel breakaway means for mounting the flanking elongate hood support members for movement between a normal position generally parallel to the first elongate hood support member, and deflected positions with the flanking elongate hood support members disposed at angles significantly less than 180 degrees with respect to the first elongate hood support member, thereby affording movement of the flanking elongate hood support member to one of those deflected positions upon engagement of one of said hoods on the flanking elongate hood support portion with a fixed object on the ground (e.g., a support for vines or a tree trunk) as the assembly is moved over the ground to afford movement of the flanking elongate hood support members around such objects; and means effective when the flanking elongate hood support members are not in engagement with such a fixed object for moving the flanking elongate hood support portion to their normal positions.

Also, those mounting means can further include raising means which afford movement of either of the flanking elongate hood support members from their normal position to a storage position at which the flanking elongate hood support members project generally vertically upwardly to facilitate their storage or transportation between different areas to be sprayed.

The supported portion of the frame can be attached directly to a motorized vehicle such as a tractor, or advantageously, can be attached to or incorporated in a frame for a mobile unit on wheels adapted to be towed by an all terrain motorized vehicle or other motorized vehicle. Such a mobile unit can include a liquid supply tank and means for pumping liquid from said liquid supply tank and through the liquid distribution system.

BRIEF DESCRIPTION OF THE DRAWING

The present invention will be further described with reference to the accompanying drawing wherein like reference numerals refer to like parts in the several views, and wherein.

DETAILED DESCRIPTION

Figure 1:
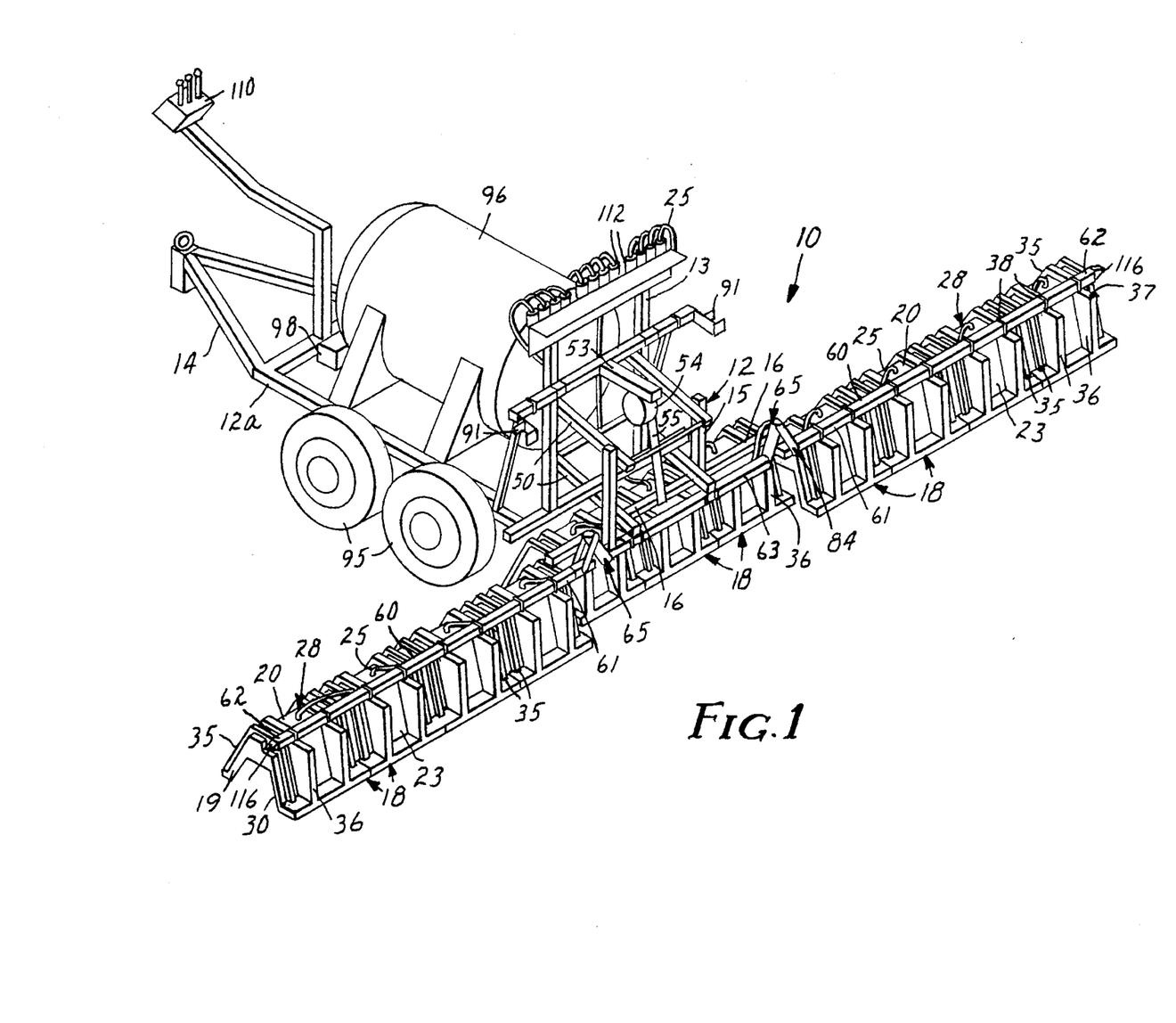
FIG. 1 is a perspective view of an assembly according to the present invention.
Figure 2A:
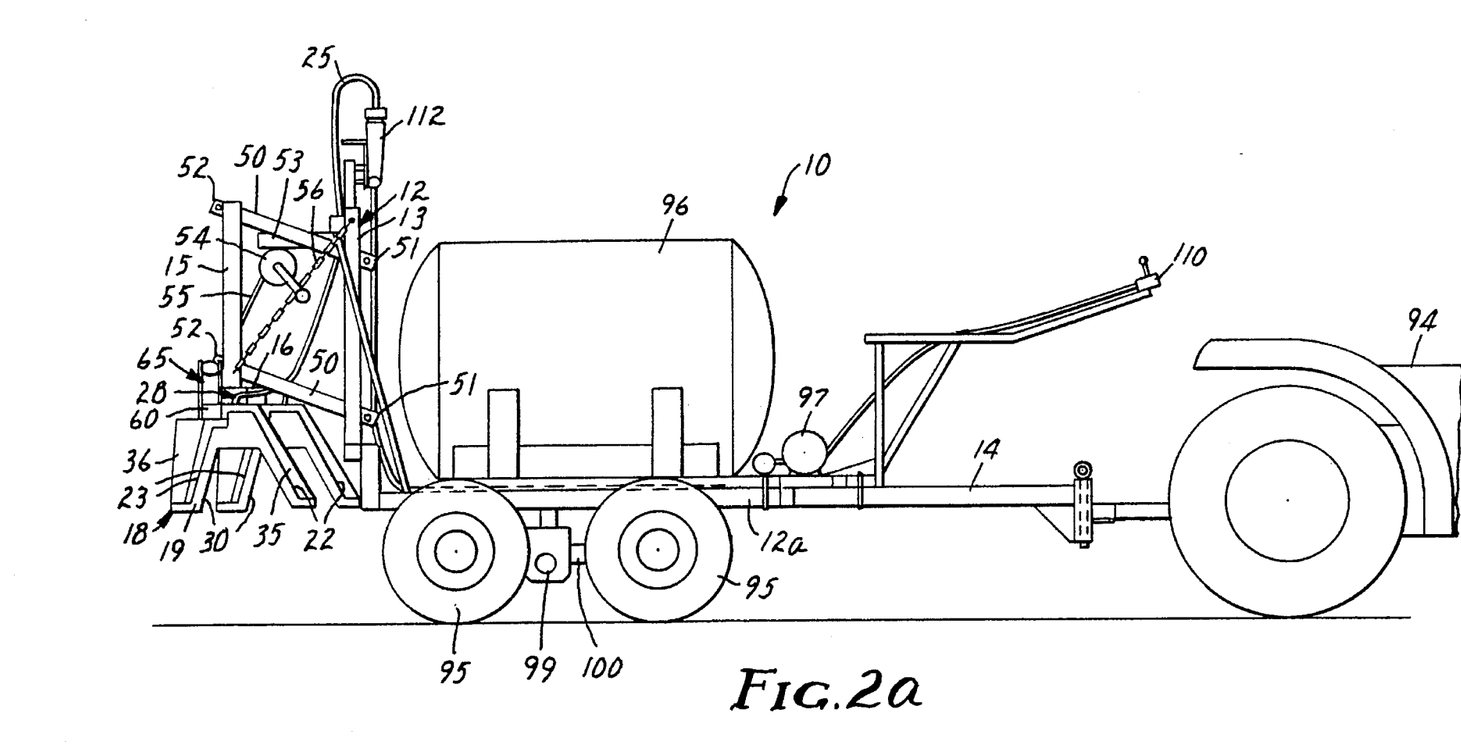
FIG. 2a is a side view of the assembly of FIG. 1 shown attached to a fragment of a motorized vehicle.
Figure 2B:
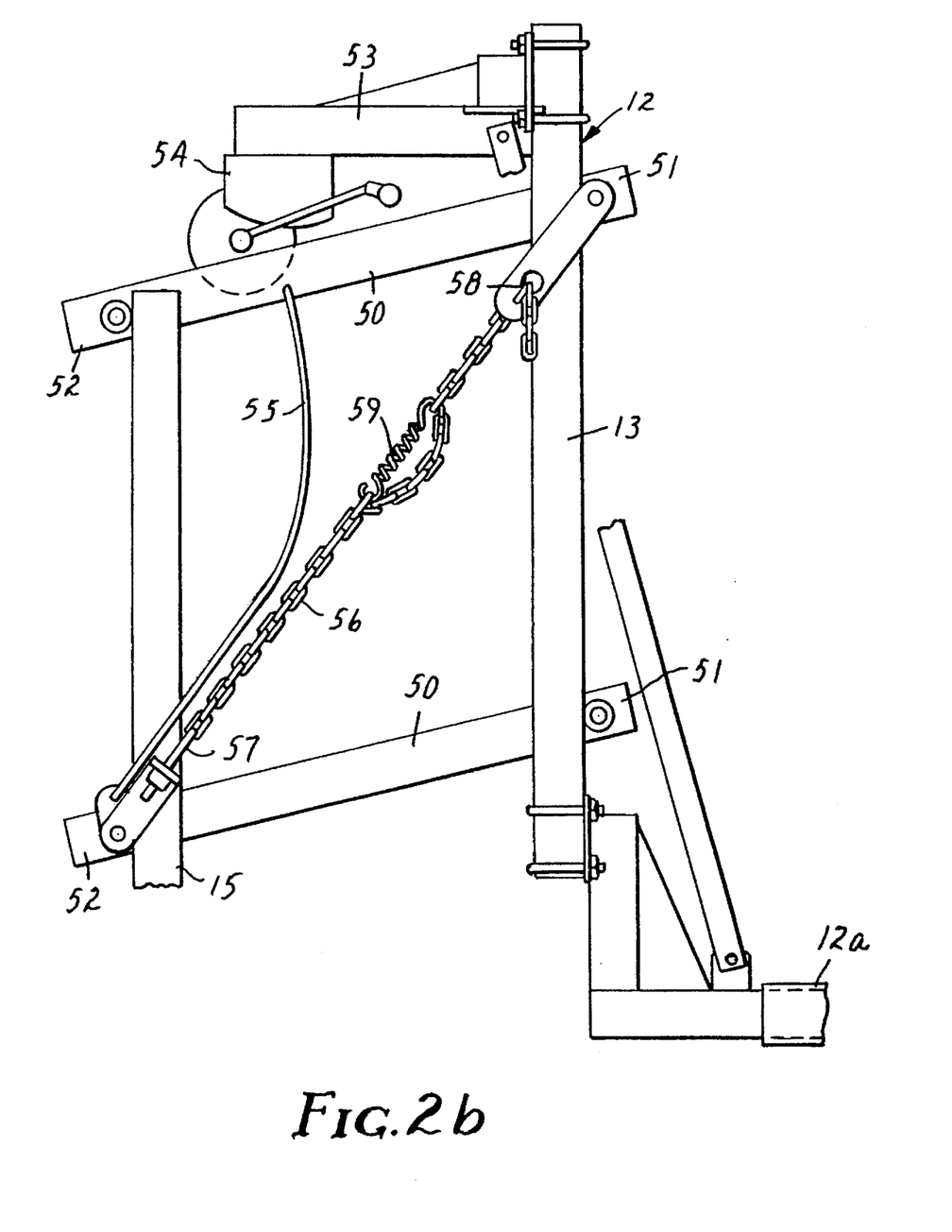
FIG. 2b is an enlarged fragmentary side view showing details of an adjustment means in a frame of the assembly of FIG. 1.
Figure 3:
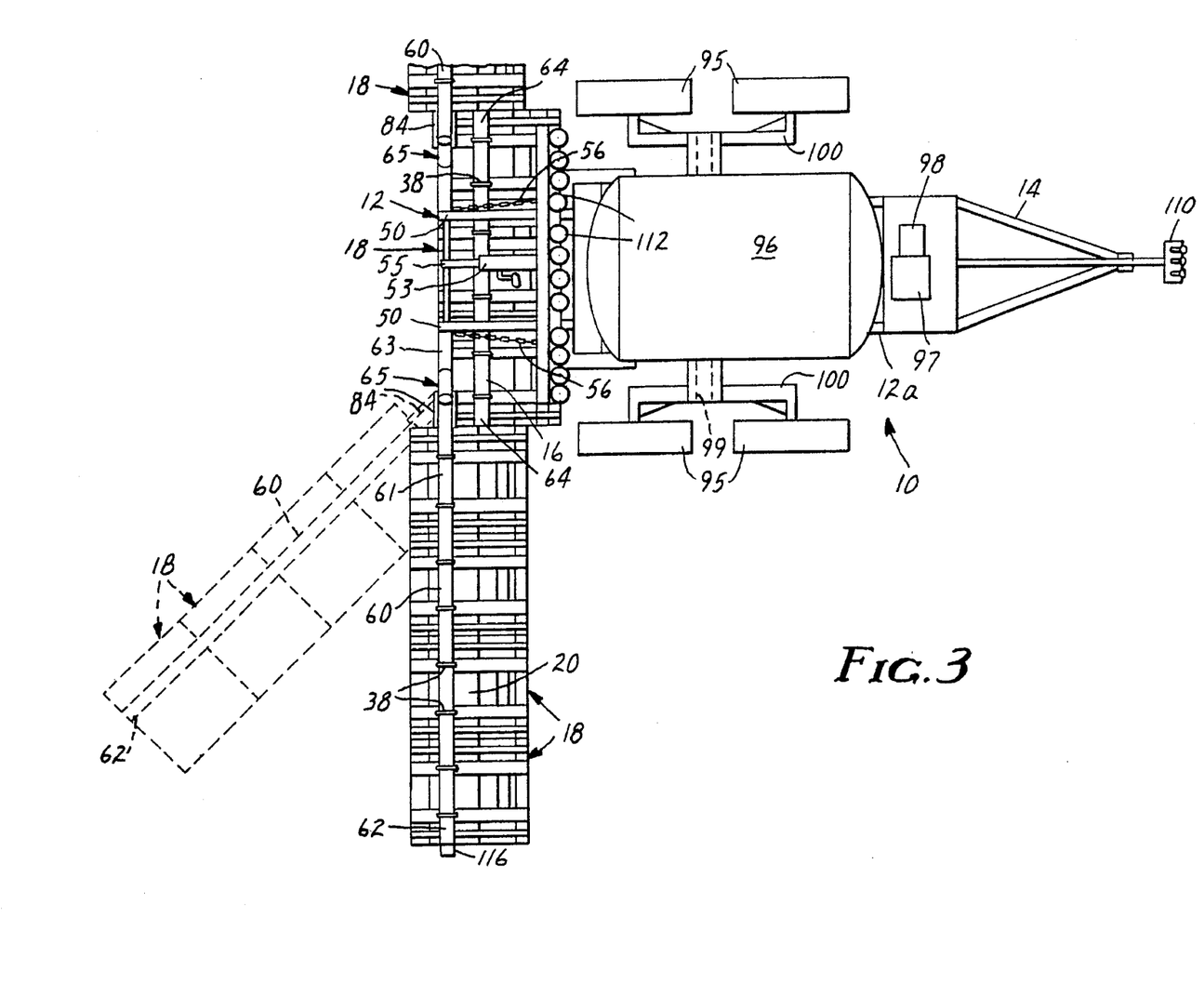
FIG. 3 is a fragmentary top view of the assembly of FIG. 1 also showing in dotted outline one of many deflected positions to which flanking elongate hood support members on said assembly can be moved from normal positions illustrated in FIGS. 1, 2 and 3.

Referring now particularly to FIGS. 1, 2, and 3 of the drawing, there is shown an assembly according to the present invention generally designated by the reference numeral 10, which assembly 10 is particularly adapted for use to spray liquids such as herbicides toward the ground while the assembly 10 limits the drift of such sprayed liquids.

Generally, the assembly 10 comprises a frame 12 including a supported portion 13 adapted to be mounted on a mobile unit 14 adapted to transport the frame 12 along the ground, and a hood support portion 15 comprising a first elongate hood support member 16; and a plurality of separate hoods 18 (see also FIGS. 8, 9 and 10) each having opposite ends 19 defined by end walls, a top wall 20 extending between its ends 19, and spaced, diverging, opposite front and rear side walls 22 and 23 projecting from opposite sides of the top wall 20 and extending between its ends 19. Means later to be explained are provided for attaching the hoods 18 along the first elongate hood support member 16 with the side walls 22 and 23 generally parallel to the elongate hood 18 support member 16 and depending downwardly from the top walls 20 of the hoods 18 so that the top and side walls 22 and 23 define spaces in the hoods 18. A liquid distribution system 25 is provided that includes spray nozzles 27 and nozzle mounting means 28 mounting the spray nozzles 27 on the hoods 18 within those spaces in positions adapted to direct liquid spray toward the ground, whereupon the top and side walls 20, 22, and 23 will limit the drift of such liquid spray.

Hoods 18 are attached end 19 to end 19 along the elongate hood support member 16. The hoods 18 have end openings 30 through their ends 19 defined by the end walls of the hoods 18 (see FIGS. 8 and 10) that are adapted to afford movement of liquid sprayed into the space in one hood 18 through the end openings 30 and into the space in an adjacent hood 18. Preferably, each of the hoods 18 has a relatively short length between its ends 19 (i.e., preferably 20 inches while longer lengths such as 24, 32 or up to about 36 inches might also be suitable). One of the end walls defining the openings 30 through the ends 19 can include at least one and preferably two ridges 32 generally normal to the top wall 20, and the other of the end walls has an equal number of groove 33 spaced, located and otherwise adapted to receive the ridges 32 on an adjacent hood 18 to help maintain the hoods 18 in alignment along the first elongate hood support member 16.

Figure 8:
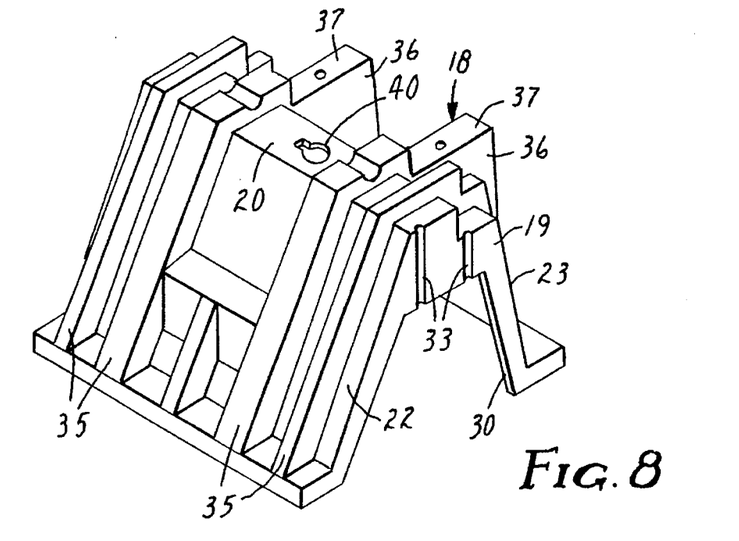
FIG. 8 is a perspective view of one of a plurality of hoods included in the assembly of FIG. 1.
Figure 9:
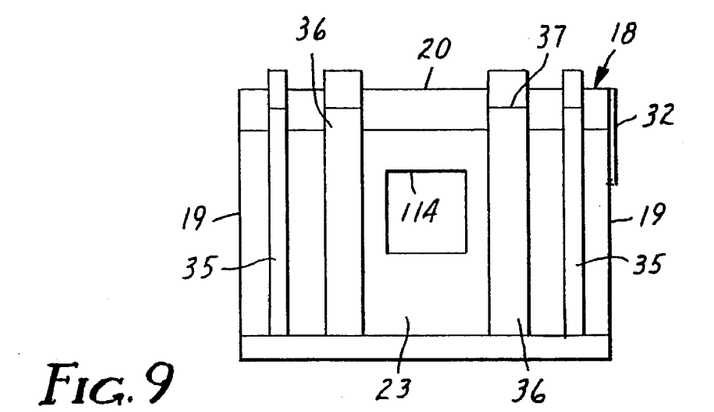
FIG. 9 is a rear side view of the hood illustrated in FIG. 8.
Figure 10:
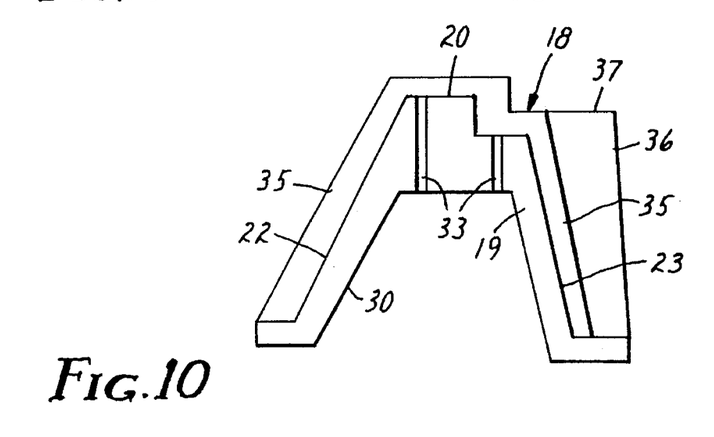
FIG. 10 is an end view of the hood illustrated in FIG. 8.

Each of the hoods 18 preferably is a molding of stiff flexible polymeric material (e.g., of polypropylene) having reinforcing ridges 35 generally parallel to its ends 19 and spaced between its ends 19. Two of the reinforcing ridges 35 have ridge parts 36 projecting away from the top wall 20 past the major portion of the rear side wall 32 not provided by the ridges 35. The ridge parts 36 have top surfaces 37 generally parallel with the top wall 20. The first elongate hood support member 16 is a rectangular tube so that it has a flat bottom surface. The means for attaching, provided by U bolts 38 extending around the support member 16 and though openings in the ridge parts 36, attaches the hoods 18 along the elongate hood support member 16 with the top surfaces 37 along the ridge parts 36 against its flat bottom surface to position the top wall 20 at one side of the elongate hood support member 16 so that it is accessible to attach and remove the nozzle mounting means 28 that mount the nozzles 27 on the hoods 18.

Figure 11:
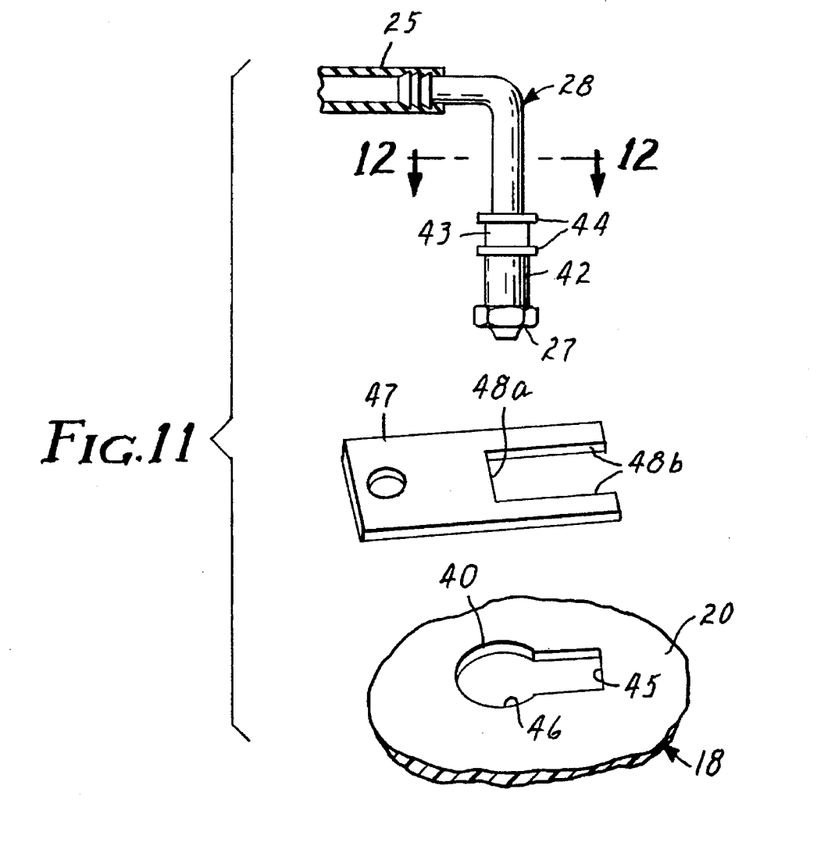
FIG. 11 is an exploded and enlarged fragmentary view of nozzle mounting means used on the hoods in the assembly of FIG. 1.
Figure 12:
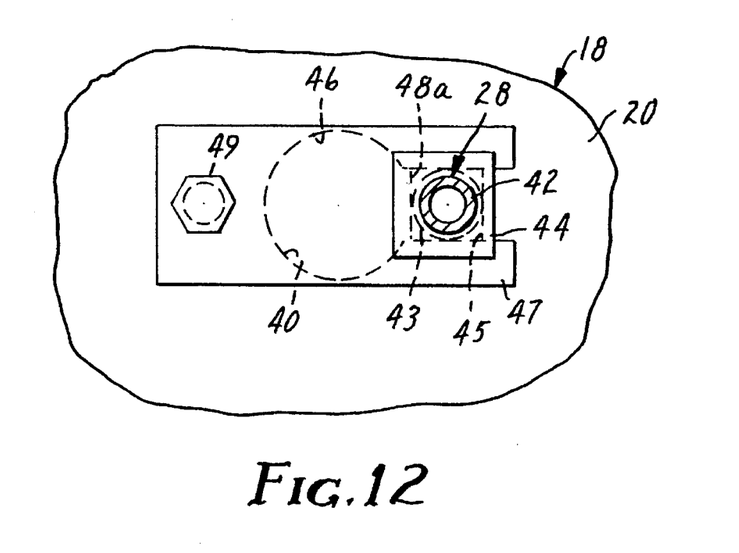
FIG. 12 is a fragmentary sectional view of the nozzle mounting means shown in FIG. 11 taken approximately along line 12—12 of FIG. 11 after the parts therein are assembled.

Those nozzle mounting means 28, illustrated in FIGS. 11 and 12, comprise the top wall 20 of each hood 18 having a through generally key-hole shaped opening 40 between its inner and outer surface that receives a connector assembly 42 included in the liquid distribution system 25. That connector assembly 42 is of a known type that has an axis and a rectangular four sided periphery 43 about its axis and spaced radially outwardly projecting flanges 44 having predetermined maximum peripheral dimensions. The flanges 44 are positioned on opposite axially spaced sides of the rectangular periphery 43. The through opening 40 in the top wall 20 includes a retaining portion 45 defined by three surfaces between the inner and outer surfaces of the top wall 20 adapted to closely receive three of the four sides of the periphery 43 of the connector assembly 42 with the spaced flanges 44 of the connector assembly 42 adjacent the inner and outer surfaces of the top wall 20, and a circular entrance portion 46 larger than the periphery of the flanges 44 on the side of the retaining portion 45 not defined by the three surfaces. The entrance portion 46 of the opening 40 affords axial movement of the rectangular periphery 43 of the connector assembly 42 into the entrance portion 46 of the opening 40 to a position where it may be slid radially into the retaining portion 45 of the opening 40. The nozzle mounting means 28 also include an attachment plate 47 having a retaining edge surface 48a and two side edges 48b disposed at right angles to the retaining edge 48a to define, with the retaining edge 48a, a generally U-shaped slot with the edges 48a and 48b adapted to fit closely along three of the four sides of the rectangular periphery 43 of the connector assembly 42. The attachment plate 47 is adapted to be positioned in a retaining position between one of the inner or outer surfaces of the top wall 20 (preferably the outer surface) and the adjacent flange 44 of the connector assembly 42 when the connector assembly 42 is in the retaining portion 45 of the opening 40. In that retaining position, illustrated in FIG. 12, the retaining edge surface 48a of the attachment plate 47 is positioned across the side of the retaining portion 45 not defined by the three surfaces, and the attachment plate 47 extends over the entrance portion 46 of the opening 40. Means in the form of a self tapping screw 49 is provided for releasably retaining the attachment plate 47 in its retaining position.

The frame 12 includes adjustment means (best seen in FIGS. 2a and 2b) between the hood support portion 15 and the supported portion 13 of the frame 12 for adjusting the height of the hood support portion 15 above the ground relative to the supported portion 13. That adjustment means includes a plurality of or four pivot bars 50 each pivotally mounted at one end 51 about a horizontal axis on the supported portion 13 that is parallel to the first elongate hood support member 16, and pivotally mounted at its other end 52 about a horizontal axis on the hood support portion 15 that is also parallel to the first elongate hood support member 16. As can best be seen in FIG. 2, the supported portion 13, the hood support portion 15 and the pivot bars 50 are arranged to provide a generally parallelogram shaped assembly adapted to afford movement of the hood support portion 15 to various positions above the ground relative to the supported portion 13 by pivoting of the four pivot bars 50. A convention manually operable winch assembly 54 (i.e., a winch assembly of the type typically used to pull boats onto boat trailers) that provides a large mechanical advantage when manually operated is mounted on a projecting part 53 of the supported portion 13 and includes a strap 55 that extends between a reel on the winch assembly 54 and the hood support portion 15. That strap 55 is adjustable in length by manual operation of the winch assembly 54 to thereby change the angles between the parts of the parallelogram structure described above and provide means for adjusting the height of the hood support portion 15, and thereby the lower edges of the hoods 18, above the ground relative to the supported portion 13 of the frame 12. The adjustment means also includes support means, manually adjustable in length, between the hood support portion 15 and the supported portion 13 for supporting the hood support portion 15 at a desired height (i.e., the strap 55 is not adapted to support that weight during operation of the assembly 10, and is typically left slack between adjustments of the height of the hood support portion 15). That support means is provided by a pair of chains 56 on opposite sides of the pivot bars 50 extending diagonally downwardly from the supported portion 13 to the hood support portion 15. One end of each of the chains 56 is welded to a bolt 57 having an end adjustably secured by spaced nuts through a bracket attached to the hood support portion 15 for fine adjustment of the effective length of the chain 56; while a selected one of the links of the chain 56 adjacent its end opposite the bolt 57 is inserted in the narrow portion of a key-hole shaped slot 58 in a bracket attached to the supported portion 13 of the frame 12 to releasably secure the chain 56 in that slot 58 with a predetermined desired length of the chain 56 extending between that slot 58 and the hood support portion 15. A spring 59 is attached between links of the chain 56 intermediate the bolt 57 and the chain links that potentially will be engaged in the slot 58. That spring 59 normally supports the weight of the hood support portion 15 and hoods 18 and portions of the liquid distribution system 25 thereon. Extension of the spring 59 to a length limited by the length of the part of the chain 56 extending around it provides a cushion between the supported portion 13 and the hood support portion 15 against jolts imparted through the supported portion 13 of the frame 12 by the assembly 10 being moved over rough terrain.

In addition to the first elongate hood support member 16, the hood support portion 15 further includes flanking elongate hood support members 60 having inner and outer ends 61 and 62, a plurality of the separate hoods 18 attached by the same attachment means described above along the flanking elongate hood support members 60 and having spray nozzles 27 mounted by the same type of nozzle mounting means 28 described above that are included in the liquid distribution system 25. Four hoods 18 are illustrated along each flanking elongate hood support member 60, however shorter flanking elongate hood support members each with three or with one hood are also useful for some purposes. The inner ends 61 of the flanking elongate hood support members 60 are attached by mounting means 65 best seen in FIGS. 1 and 5 to opposite ends of a support bar 63 that is parallel to and fixed to the first elongate hood support member 16 with those inner ends 61 each adjacent a different one of opposite ends 64 of the first elongate hood support member 16. Those mounting means 65 include breakaway means for mounting the inner end 61 of each of the flanking elongate hood support members 60 adjacent a different one of the ends 64 of the first elongate hood support member 16 for movement between a normal position illustrated in FIGS. 1, 2, and 3 generally parallel to the first elongate hood support member 16, and deflected positions (one of which is illustrated in dotted outline in FIG. 3) with the flanking elongate hood support members 60 disposed at angles significantly less than 180 degrees with respect to the first elongate hood support member 16 in a plane extending somewhat upwardly away from the rear walls of the hoods 18 on the first elongate hood support member 16 but still generally parallel to the ground. That breakaway means affords movement of the flanking elongate hood support member 60 to one of the deflected positions upon engagement of one of the hoods 18 on the flanking elongate hood support portion 60 with a fixed object on the ground (e.g., a vine support or a tree trunk) as the assembly 10 is moved over the ground to afford movement of the flanking elongate hood support members 60 around that object. Additionally, that breakaway means includes means effective when the flanking elongate hood support members 60 are not in engagement with such a fixed object for moving the flanking elongate hood support members 60 to their normal positions.

Figure 5:
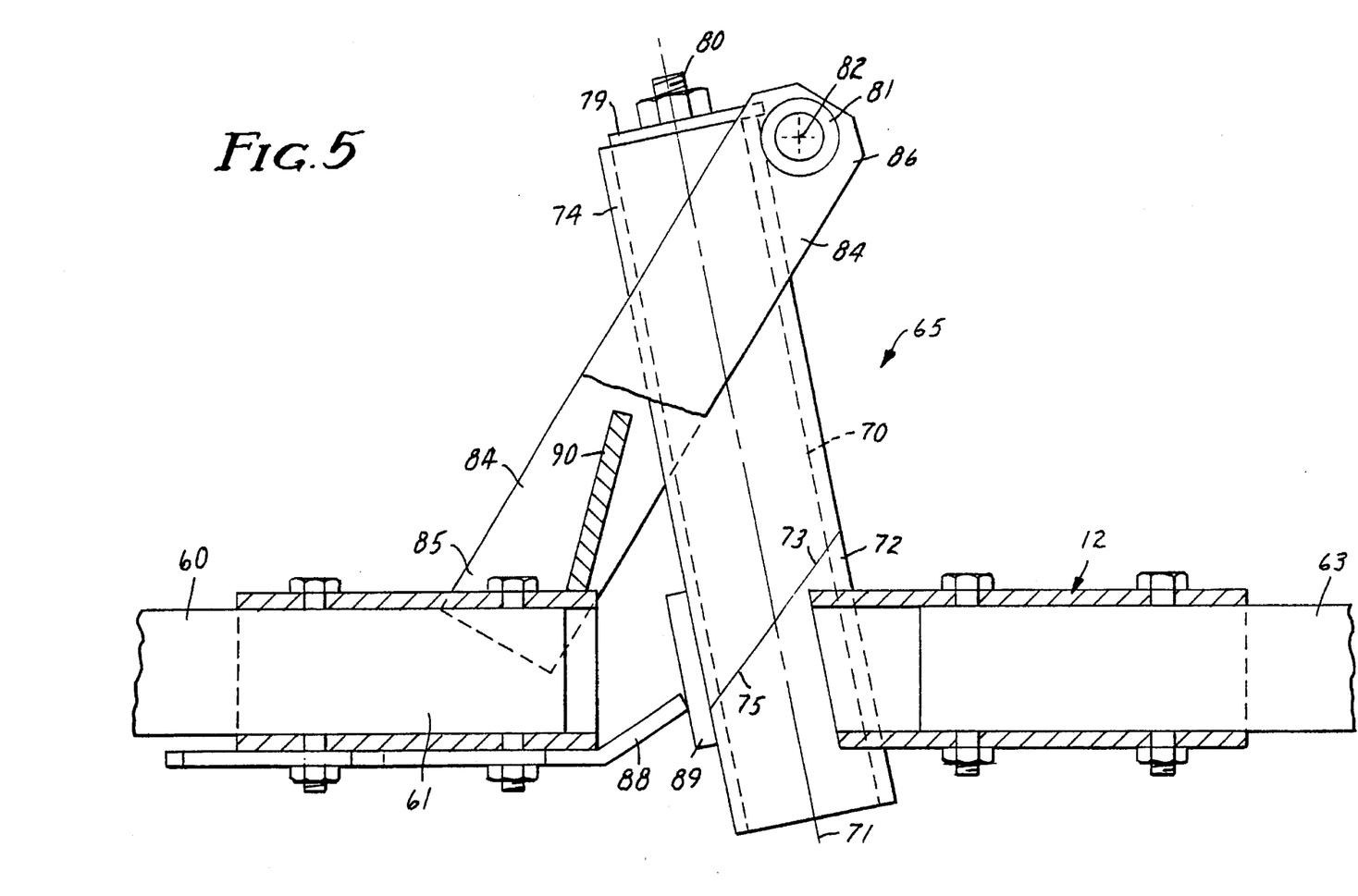
FIG. 5 is an enlarged fragmentary side view of means included in said assembly that affords movement of the flanking elongate hood support members between the normal positions illustrated in FIGS. 1, 2 and 3 and the deflected positions and storage positions illustrated in FIGS. 3 and 4.
Figure 6:
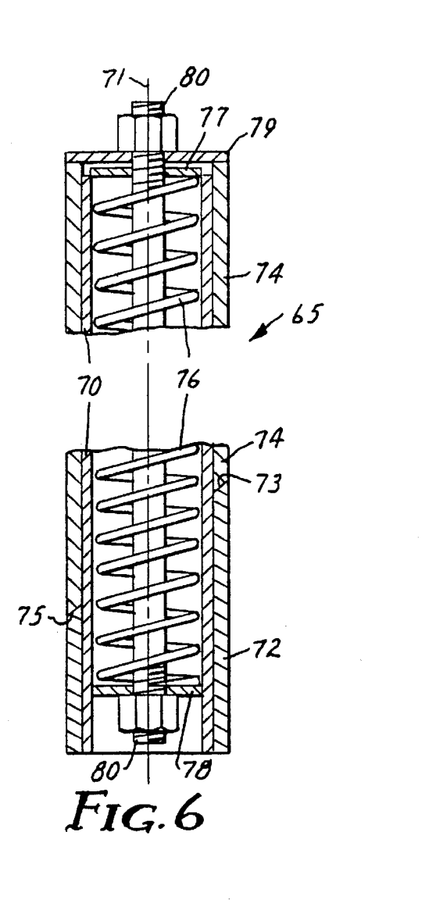
FIGS. 6 and 7 are fragmentary sectional views taken along an axis 71 illustrated in FIG. 5 and in the plane of FIG. 5 that illustrate the position of parts of the means illustrated in FIG. 5 when the flanking elongate hood support members are in their normal position (FIG. 6) and in their deflected positions (FIG. 7)
Figure 7:
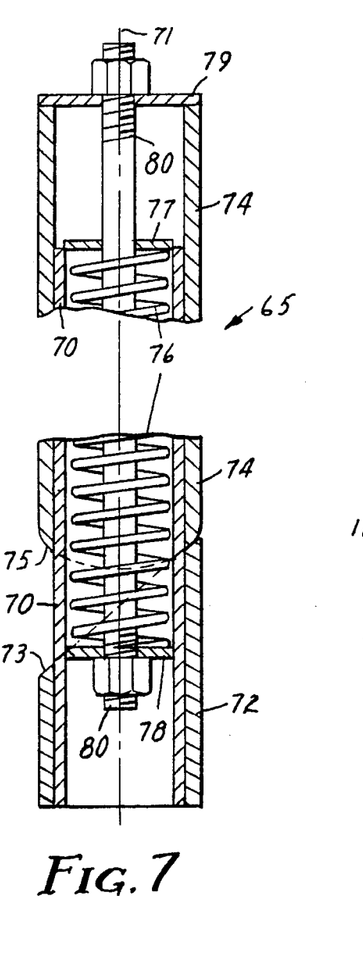

As is best seen in FIGS. 5, 6 and 7, each of the breakaway means is provided by a generally hollow cylindrical bearing member 70 fixed at and projecting upwardly from the support bar 63 adjacent one of the ends 64 of the first elongate hood support member 16 with its axis 71 in a generally vertical plane and extending transverse to the first elongate hood support member 16 (e.g., at an angle with respect to the length of the first elongate hood support member 16 of about 100 degrees as illustrated). A fixed collar 72 is fixed around the bearing member 70 and has an annular supporting cam surface 73 around the bearing member 70 and facing the end of the bearing member 70 opposite the support bar 63. A pivot collar 74 extends around and is pivotable around the bearing member 70. The pivot collar 74 has an annular supported cam surface 75 bearing against the supporting cam surface 73. The cam surfaces 73 and 75 are oriented at an angle to the axis 71 (e.g., an angle of about 45 degrees as illustrated) that affords the cam surfaces 73 and 75 being in full surface engagement when the attached flanking hood support member 60 is in its normal position (FIGS. 5 and 6) and causes movement of a portion of the supported cam surface 75 along the supporting cam surface 73 (FIG. 7) when the flanking elongate hood support member 60 is moved to one of its deflected positions, which moves the pivot collar 74 axially of the bearing member 70 away from the support bar 63 and first elongated hood support member 16. Spring means in the form of a spring 76 within the bearing member 70 and compressed between a plate 77 fixed across the upper end of the bearing member 70 and a plate 78 at its opposite end secured to a plate 79 across the upper end of the pivot collar 74 by a bolt 80 are provided for biasing the pivot collar 74 axially towards the supporting cam surface 73. That spring means together with the weight of the flanking elongate hood support member 60 and the hoods 18 and parts of the liquid distribution system 25 thereon provides the means effective when the flanking elongate hood support members 60 are not in engagement with such a fixed object for moving the flanking elongate hood support members 60 to their normal positions.

Figure 4:
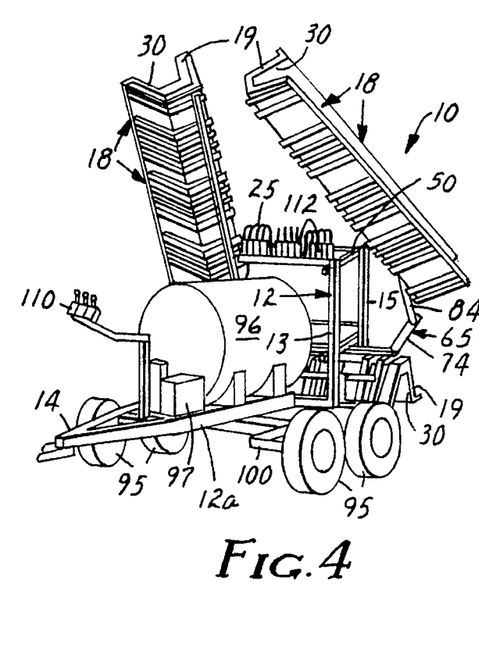
FIG. 4 is a reduced perspective view of the assembly of FIG. 1 illustrating storage positions to which flanking elongate hood support members on said assembly can be moved from normal positions illustrated in FIGS. 1, 2 and 3.

The mounting means 65 further includes raising means for mounting the inner end 61 of each of the flanking elongate hood support members 60 adjacent a different one of the ends 64 of the first elongate hood support member 16 for movement between its normal position and a storage position (FIG. 4) with the flanking elongate hood support members 60 projecting generally vertically upwardly from adjacent the end 64 of the first elongate hood support member 16. The raising means for each flanking elongate hood support member 60 includes a pivot member 81 on the pivot collar 74 having a pivot axis 82 transverse of the axis 71 and of the flanking elongate hood support member 60; spaced parallel pivot bars 84 having first ends 85 fixed to and projecting generally upwardly from the inner end 61 of the flanking elongate hood support member 60 with a brace 90 welded therebetween, and opposite ends 86 mounted on the pivot member 81 for rotation about the pivot axis 82. The bearing member 70 and each of the flanking hood support members 60 have parts 88 and 89 spaced from the pivot axes 82 in engagement when in their normal or deflected positions. When in their raised positions, the flanking hood support members 60 are received in clevises 91 mounted on adjacent sides of the supported portion 13 of the frame 12, and pins (not shown) can be inserted through openings in the clevises and in the flanking hood support members 60 to releasably retain them in the clevises 91.

As is illustrated in FIGS. 1, 2 and 3, the supported portion 13 of the frame 12 is attached to or incorporated in a frame 12a for the mobile unit 14 that is adapted to be towed by an all terrain motorized vehicle 94 or other motorized vehicle and to thereby transport the frame 12 along the ground. The mobile unit 14 includes four wheels 95, and means rotatably mounting the wheels 95 on opposite sides of the mobile unit frame 12a for movably supporting the mobile unit frame 12a for movement over the ground. Preferably, as illustrated, two of the wheels 95 are located on each of the sides of the mobile unit frame 12a by an axle 99 that defines a transverse pivot axis relative to the mobile unit frame 12a, and two wheel support members 100 each having two of the wheels 95 rotatably mounted at its opposite ends in axially parallel relationship. The wheel support members 100 are pivotally mounted on opposite ends of the axle 99 generally midway between the wheels 95 with the pivot axis lower than and parallel to the axes of the wheels 95. Preferably, as illustrated, the axle 99 is slightly closer to the rear wheels 95 than to the front wheels 95 (e.g., about 2 inches closer in an overall spacing of about 27⅜ inches between the centers of the wheels 95). Such wheel mounting, which is known and is sometimes called "walking tandem" wheel mounting, provides the advantage of allowing the wheels 95 to roll more easily over irregularities on the ground while maintaining the hoods 18 at a more uniform height above the ground than if only one wheel was used on each end of the axle 99.

A liquid supply tank 96 (e.g., 110 gallon) is mounted on the mobile unit frame 12a, and means in the form of a centrifugal pump 97 and small (e.g., 4.5 horsepower) internal combustion engine 98 mounted on the mobile unit frame 12a are provided for pumping liquid from the liquid supply tank 96 and through the liquid distribution system 25. The liquid distribution system 25 can include three valves 110 on a projecting portion of the frame 12a that makes them operable from the vehicle 94 to selectively spray through the nozzles 27 on the flanking and first elongate hood support members 60 and 16. Also, the liquid distribution system 25 includes three spray monitors 112 of the type sold by Custom Ag Products, Inc., Benson, Minn., and described in U.S. Pat. No. 4,562,863 (the content whereof is incorporated herein by reference) that are connected between the pump 97 and the nozzles 27 and are positioned so that an operator of the assembly 10 can visually tell that liquid is being sprayed through all of the nozzles 27.

Preferably, the spray nozzles 27 used are diaphragm shut off nozzles 27 adapted to only pass liquids supplied at pressures above a predetermined minimum (e.g., above 5 pound per square inch pressure). Also, preferably the rear walls of the hoods 18 have centrally located through openings 114 that afford access to the nozzles 27.

Additionally the liquid distribution system 27 can include supports 116 mounting spray nozzles 27 at the outer ends 62 of the flanking elongate hood support members 60 past the outer end 19 of the outermost hood 18, which nozzles 27 on the supports 116 are adapted to spray the ground past the those outermost ends 19 of the hoods 18 which is advantageous to apply herbicide to the ground in line with objects such as trees in a row along which the assembly 10 is being used.

The present invention has now been described with reference to one embodiment thereof. It will be apparent to those skilled in the art that many changes can be made in the embodiment described without departing from the scope of the present invention. Thus, the scope of the present invention should not be limited to the structures and methods described in this application, but only by the structures and method described by the language of the claims and their equivalents.

We claim:

1. An assembly adapted for use to spray liquids toward the ground while the assembly limits the drift of such sprayed liquids, said assembly comprising;

a frame including a supported portion adapted to be mounted on a mobile unit adapted to transport the frame along the ground, and a hood support portion comprising a first elongate hood support member;

a plurality of separate hoods each having opposite ends, a top wall extending between said ends, and spaced diverging opposite front and rear side walls projecting from opposite sides of said top wall and extending between said ends;

means for attaching said hoods along said elongate hood support member with said side walls generally parallel to said elongate hood support member and depending downwardly from said top walls of said hoods so that said top and side walls define spaces in said hoods; and a liquid distribution system including spray nozzles and nozzle mounting means mounting said spray nozzles on said hoods within said spaces in a position adapted to direct liquid spray toward the ground, whereupon said top and side walls will limit the drift of such liquid spray;

wherein each of said hoods is a stiff flexible polymeric molding having reinforcing ridges generally parallel to said ends and spaced between said ends with two of said ridges having ridge parts projecting away from said top wall past the major portion of said rear side wall and having top surfaces generally parallel with said top wall; said elongate hood support member has a flat bottom surface, and said means for attaching attaches said hoods along said elongate hood support member with said top surfaces along said ridge parts against said flat bottom surface to position said top wall at one side of said elongate hood support member.

2. An assembly according to claim 1 wherein each of said hoods has a length between said ends of less than about 36 inches.

3. An assembly according to claim 1 wherein each of said hoods has a length between said ends of about 20 inches.

4. An assembly according to claim 1 wherein said top wall has inner and outer major surfaces and said nozzle mounting means mounting said spray nozzles on said hoods within said spaces comprises said top wall of said hood having a through opening receiving a connector assembly included in said liquid distribution system, said connector assembly having an axis and a rectangular four sided periphery about said axis and spaced radially outwardly projecting flanges having predetermined maximum peripheral dimensions, said flanges being positioned on opposite axially spaced sides of said rectangular periphery; said through opening in said top wall includes a retaining portion defined by three surfaces between the inner and outer surfaces of said top wall adapted to closely receive three of the four sides of the periphery of the connector assembly with the spaced flanges of the nozzle assembly adjacent the inner and outer surfaces of the top wall, and an entrance portion larger than the periphery of the flanges on the side of the retaining portion not defined by said three surfaces, said entrance portion affording axial movement of the rectangular periphery of the connector assembly into said entrance portion to a position where it may be slid radially into the retaining portion of the opening; and said assembly further includes an attachment plate having a retaining edge surface adapted to be positioned in a retaining position between one of the inner and outer surfaces of the top wall and the flange of the nozzle assembly adjacent said one of the inner and outer surfaces of the top wall when the nozzle assembly is in the retaining portion of the opening with said retaining edge surface of the attachment plate across the side of the retaining portion not defined by said three surfaces in the retaining portion; and means for releasably retaining said attachment plate in said retaining position.

5. An assembly according to claim 1 wherein said frame includes adjustment means between said hood support portion and said supported portion for adjusting the height of said hood support portion above the ground relative to said supported portion.

6. An assembly according to claim 5 wherein said adjustment means includes a plurality of pivot bars having opposite ends, each pivot bar being pivotally mounted at one end on said supported portion and pivotally mounted at its other end on said hood support portion, said supported portion, said hood support portion and said pivot bars being arranged to form a generally parallelogram shaped structure adapted to afford movement of said hood support portion to various positions above the ground relative to said supported portion;

adjustable means providing a large mechanical advantage and being manually adjustable in length and connected between said supported portion and said hood support portion for adjusting the height of said hood support portion above the ground relative to said supported portion; and support means manually adjustable in length for supporting said hood support portion at a predetermined position above the ground, said support means including spring means for cushioning said hood support portion from impacts to said supported portion of the frame.

7. An assembly according to claim 1 wherein:

said first elongate hood support member has opposite ends; and said hood support portion further includes flanking elongate hood support members having inner and outer ends, a plurality of said separate hoods attached by said attachment means along said flanking elongate hood support members and having spray nozzles included in said liquid distribution system mounted therein, and mounting means for mounting the inner end of each of said flanking elongate hood support members on said hood support portion adjacent a different one of said ends of said first elongate hood support member, said mounting means including breakaway means for mounting the inner end of each of said flanking elongate hood support members to said hood support portion for movement between a normal position generally parallel to said first elongate hood support member, and deflected positions with said flanking elongate hood support members disposed at angles significantly less than 180 degrees with respect to said first elongate hood support member, and for affording movement of said flanking elongate hood support member to one of said deflected positions upon engagement of one of said hoods on said flanking elongate hood support portion with a fixed object on the ground as said assembly is moved over the ground to afford movement of said flanking elongate hood support members around said object, and means effective when said flanking elongate hood support members are not in engagement with such a fixed object for moving said flanking elongate hood support portion to said normal position.

8. An assembly according to claim 1 wherein said supported portion of said frame is attached to a mobile unit frame for a mobile unit included in said assembly and adapted to be towed by a motorized vehicle and to thereby transport said frame along the ground, said mobile unit further including a plurality of wheels, and means rotatably mounting said wheels on opposite sides of said mobile unit frame for movably supporting the mobile unit frame for movement over the ground, a liquid supply tank mounted on said mobile unit frame, and means mounted on said mobile unit frame for pumping liquid from said liquid supply tank and through said liquid distribution system.

9. An assembly according to claim 1 wherein said spray nozzles are diaphragm shut off nozzles adapted to only pass liquids supplied at pressures above a predetermined minimum, and said rear walls of said hoods have through openings adjacent said top walls affording access to said nozzles.

10. An assembly adapted for use to spray liquids toward the ground while the assembly limits the drift of such sprayed liquids, said assembly comprising;

a frame including a supported portion adapted to be mounted on a mobile unit adapted to transport the frame along the ground, and a hood support portion comprising a first elongate hood support member;

a plurality of separate hoods each having opposite ends, a top wall extending between said ends, and spaced diverging opposite front and rear side walls projecting from opposite sides of said top wall and extending between said ends;

means for attaching said hoods along said elongate hood support member with said side walls generally parallel to said elongate hood support member and depending downwardly from said top walls of said hoods so that said top and side walls define spaces in said hoods; and a liquid distribution system including spray nozzles and nozzle mounting means mounting said spray nozzles on said hoods within said spaces in a position adapted to direct liquid spray toward the ground, whereupon said top and side walls will limit the drift of such liquid spray;

at least some of said hoods being attached end to end along said elongate hood support member and having end openings through said ends adapted to afford movement of liquid sprayed into the space in one hood through said end openings and into the space in an adjacent hood; and wherein each of said hoods has opposite end walls defining said openings through said ends, one of said end walls includes at least one ridge generally normal to said top wall and the other of said end walls has at least one groove receiving the ridge on an adjacent hood to help align said hoods along said first elongate hood support member.

11. An assembly adapted for use to spray liquids toward the ground while the assembly limits the drift of such sprayed liquids, said assembly comprising;

a frame including a supported portion adapted to be mounted on a mobile unit adapted to transport the frame along the ground, and a hood support portion comprising a first elongate hood support member;

a plurality of separate hoods each having opposite ends, a top wall extending between said ends, and spaced diverging opposite front and rear side walls projecting from opposite sides of said top wall and extending between said ends;

means for attaching said hoods along said elongate hood support member with said side walls generally parallel to said elongate hood support member and depending downwardly from said top walls of said hoods so that said top and side walls define spaces in said hoods; and a liquid distribution system including spray nozzles and nozzle mounting means mounting said spray nozzles on said hoods within said spaces in a position adapted to direct liquid spray toward the ground, whereupon said top and side walls will limit the drift of such liquid spray;

wherein:

said first elongate hood support member has opposite ends; and said hood support portion further includes flanking elongate hood support members having inner and outer ends, a plurality of said separate hoods attached by said attachment means along said flanking elongate hood support members and having spray nozzles included in said liquid distribution system mounted therein, and mounting means for mounting the inner end of each of said flanking elongate hood support members on said hood support portion adjacent a different one of said ends of said first elongate hood support member, said mounting means including breakaway means for mounting the inner end of each of said flanking elongate hood support members to said hood support portion for movement between a normal position generally parallel to said first elongate hood support member, and deflected positions with said flanking elongate hood support members disposed at angles significantly less than 180 degrees with respect to said first elongate hood support member, and for affording movement of said flanking elongate hood support member to one of said deflected positions upon engagement of one of said hoods on said flanking elongate hood support portion with a fixed object on the ground as said assembly is moved over the ground to afford movement of said flanking elongate hood support members around said object, and means effective when said flanking elongate hood support members are not in engagement with such a fixed object for moving said flanking elongate hood support portion to said normal position; and wherein each of said breakaway means comprises a generally cylindrical bearing member having an axis, being fixed at and projecting upwardly from adjacent one end of said first elongate hood support member with said axis in a generally vertical plane and extending transverse to said first elongate hood support member, a collar fixed around said bearing member having an annular supporting cam surface around said bearing member facing the end of said bearing member opposite said first elongate hood support member, a pivot collar extending around and pivotable around said bearing member, said pivot collar having an annular supported cam surface bearing against said supporting cam surface, said cam surfaces being oriented at an angle to said axis that affords said cam surfaces being in full surface engagement when said flanking hood support member is in said normal position and causing movement of a portion of said supported cam surface along said supporting cam surface when said flanking elongate hood support member is moved to one of said deflected positions to thereby move the pivot collar axially of said bearing member away from said first elongated hood support member, and spring means for biasing said pivot collar axially towards said supporting cam surface.

12. An assembly according to claim 11 wherein said mounting means further includes raising means for mounting the inner end of each of said flanking elongate hood support members to a different one of said ends of said first elongate hood support member for movement between said normal position and a storage position with said flanking elongate hood support member projecting generally vertically upwardly from the adjacent first end of said first elongate hood support member, said raising means including a pivot member on said pivot collar having a generally horizontally disposed pivot axis transverse of said flanking elongate hood support member, pivot bars having first ends fixed to and projecting generally upwardly from said inner ends of said flanking elongate hood support members, and opposite ends mounted on said pivot member for rotation about said pivot axis, said flanking hood support member and said bearing member having a first pair of parts spaced from said pivot axes in engagement when said flanking elongate hood support member is in said normal and deflected positions and a second pair of parts spaced from said pivot axes in engagement when said flanking elongate hood support member is in said raised position.

13. An assembly adapted for use to spray liquids toward the ground while the assembly limits the drift of such sprayed liquids, said assembly comprising;

a frame including a supported portion adapted to be mounted on a mobile unit adapted to transport the frame along the ground, and a hood support portion comprising a first elongate hood support member;

a plurality of separate hoods each having opposite ends, a top wall extending between said ends, and spaced diverging opposite front and rear side walls projecting from opposite sides of said top wall and extending between said ends;

means for attaching said hoods along said elongate hood support member with said side walls generally parallel to said elongate hood support member and depending downwardly from said top walls of said hoods so that said top and side walls define spaces in said hoods; and a liquid distribution system including spray nozzles and nozzle mounting means mounting said spray nozzles on said hoods within said spaces in a position adapted to direct liquid spray toward the ground, whereupon said top and side walls will limit the drift of such liquid spray;

wherein:

said first elongate hood support member has opposite ends; and said hood support portion further includes flanking elongate hood support members having inner and outer ends, a plurality of said separate hoods attached by said attachment means along said flanking elongate hood support members and having spray nozzles included in said liquid distribution system mounted therein, and mounting means for mounting the inner end of each of said flanking elongate hood support members on said hood support portion adjacent a different one of said ends of said first elongate hood support member, said mounting means including breakaway means for mounting the inner end of each of said flanking elongate hood support members to said hood support portion for movement between a normal position generally parallel to said first elongate hood support member, and deflected positions with said flanking elongate hood support members disposed at angles significantly less than 180 degrees with respect to said first elongate hood support member, and for affording movement of said flanking elongate hood support member to one of said deflected positions upon engagement of one of said hoods on said flanking elongate hood support portion with a fixed object on the ground as said assembly is moved over the ground to afford movement of said flanking elongate hood support members around said object, and means effective when said flanking elongate hood support members are not in engagement with such a fixed object for moving said flanking elongate hood support portion to said normal position, and said mounting means further including raising means for mounting the inner end of each of said flanking elongate hood support members to a different one of said ends of said first elongate hood support member for movement between said normal position and a storage position with said flanking elongate hood support member projecting generally vertically upwardly from the adjacent first end of said first elongate hood support member.

14. An assembly adapted for use to spray liquids toward the ground while the assembly limits the drift of such sprayed liquids, said assembly comprising;

a frame including a supported portion adapted to be mounted on a mobile unit adapted to transport the frame along the ground, and a hood support portion comprising a first elongate hood support member;

a plurality of hoods each having opposite ends, a top wall extending between said ends, and spaced diverging opposite front and rear side walls projecting from opposite sides of said top wall and extending between said ends;

means for attaching said hoods along said elongate hood support member with said side walls generally parallel to said elongate hood support member and depending downwardly from said top walls of said hoods so that said top and side walls define spaces in said hoods; and a liquid distribution system including spray nozzles and nozzle mounting means mounting said spray nozzles on said hoods within said spaces in a position adapted to direct liquid spray toward the ground, whereupon said top and side walls will limit the drift of such liquid spray;

wherein:

said supported portion of said frame is attached to a mobile unit frame for a mobile unit included in said assembly and adapted to be towed by a motorized vehicle and to thereby transport said frame along the ground, said mobile unit further including a plurality of wheels, and means rotatably mounting said wheels on opposite sides of said mobile unit frame for movably supporting the mobile unit frame for movement over the ground, a liquid supply tank mounted on said mobile unit frame, and means mounted on said mobile unit frame for pumping liquid from said liquid supply tank and through said liquid distribution system;

said mobile unit including two wheels on each of said sides of said mobile unit frame, and said means rotatably mounting said wheels on said mobile unit frame includes means for defining a transverse pivot axis relative to said mobile unit frame, two wheel support members each having opposite ends with one of said wheels rotatably mounted at each of said ends in axially parallel relationship, said wheel support members being pivotally mounted midway between said ends of said wheel support members at opposite ends of said transverse pivot axis with said pivot axis parallel to said axis of said wheels.

15. An assembly adapted for use to spray liquids toward the ground while the assembly limits the drift of such sprayed liquids, said assembly comprising;

a frame including a supported portion adapted to be mounted on a mobile unit adapted to transport the frame along the ground, and a hood support portion comprising a first elongate hood support member;

a plurality of separate hoods each having opposite ends, a top wall extending between said ends, and spaced diverging opposite front and rear side walls projecting from opposite sides of said top wall and extending between said ends;

means for attaching said hoods along said elongate hood support member with said side walls generally parallel to said elongate hood support member and depending downwardly from said top walls of said hoods so that said top and side walls define spaces in said hoods; and a liquid distribution system including spray nozzles and nozzle mounting means mounting said spray nozzles on said hoods within said spaces in a position adapted to direct liquid spray toward the ground, whereupon said top and side walls will limit the drift of such liquid spray;

wherein said liquid distribution system includes spray nozzles at the outer ends of said flanking elongate hood support members and past the ends of the hoods adjacent the outer ends of the flanking elongate hood support members adapted to spraying the ground past the those ends of the hoods.

16. A hood molded of stiff polymeric material, said hood having opposite ends, a top wall extending between said ends, and spaced diverging opposite front and rear side walls projecting from opposite sides of said top wall and extending between said ends and means adapted for attaching said hood along an elongate hood support member with said side walls generally parallel to said elongate hood support member and depending downwardly from said top wall of said hood so that said top and side walls define a space in said hood within which liquid spray will be directed toward the ground by said top and side walls; said hood having end openings through said ends adapted to afford movement of liquid sprayed into the space in said hood through said end openings, said hood having reinforcing ridges generally parallel to said ends and spaced between said ends with two of said ridges having ridge parts projecting away from said top wall and past the major portion of said rear side wall, said means adapted for attaching being along said ridge parts.

17. A hood according to claim 16 having opposite end walls defining said openings through said ends, one of said end walls including at least one ridge generally normal to said top wall and the other of said end walls having at least one groove adapted to receive a ridge on another such hood to help align said hoods along means to which said hoods are attached in end to end relationship.

18. A hood according to claim 16 having a length between said ends of about 20 inches, and said rear wall of said hood has a through opening adjacent said top wall affording access to a nozzle mounted within said hood.

19. A hood according to claim 16 wherein said top wall of said hood has inner and outer major surfaces and a through opening adapted to receive a connector assembly of a known type having an axis, a rectangular four sided periphery about said axis and spaced radially outwardly projecting flanges having predetermined maximum peripheral dimensions, said flanges being positioned on opposite axially spaced sides of said rectangular periphery; said through opening in said top wall includes a retaining portion between said inner and outer surfaces of said top wall defined by three surfaces adapted to closely receive three of the four sides of the periphery of the connector assembly with the spaced flanges of the nozzle assembly adjacent the inner and outer surfaces of the top wall, and an entrance portion larger than the periphery of the flanges on the side of the retaining portion not defined by said three surfaces, said entrance portion affording axial movement of the rectangular periphery of the connector assembly into said entrance portion to a position where it may be slid radially into the retaining portion of the opening; and said hood further includes an attachment plate having a retaining edge surface adapted to be positioned in a retaining position between one of the inner and outer surfaces of the top wall and the flange of the nozzle assembly adjacent said one of the inner and outer surfaces of the top wall when the nozzle assembly is in the retaining portion of the opening with said retaining edge surface of the attachment plate across the side of the retaining portion not defined by said three surfaces in the retaining portion; and means for releasably retaining said attachment plate in said retaining position.

* * * * *